(No Model.) 2 Sheets—Sheet 1.
E. & L. PAGET.
SECONDARY BATTERY.
No. 513,245. Patented Jan. 23, 1894.
*Fig. 1,*
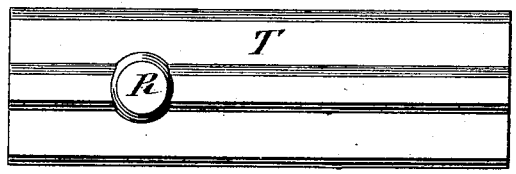
*Fig. 2,*        *Fig. 3,*
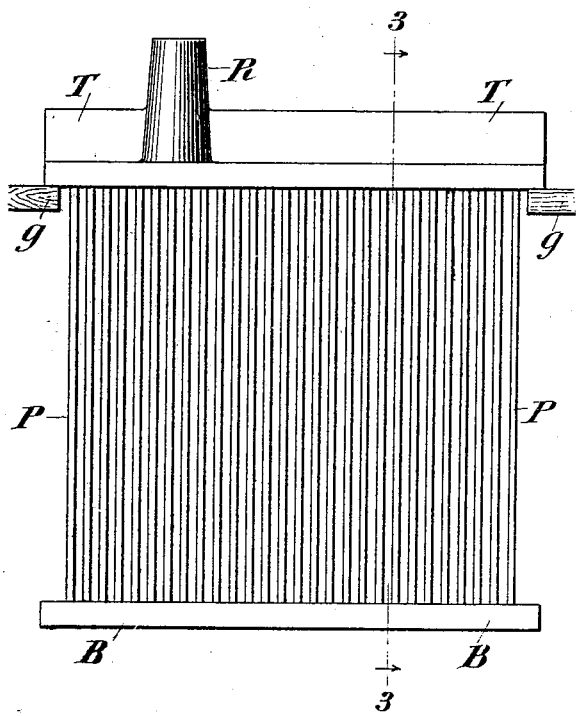 
Witnesses
C. E. Ashley
I. F. W. Lloyd
Evelyn Paget
Leonard Paget
Inventors
By their Attorney
Leonard Paget

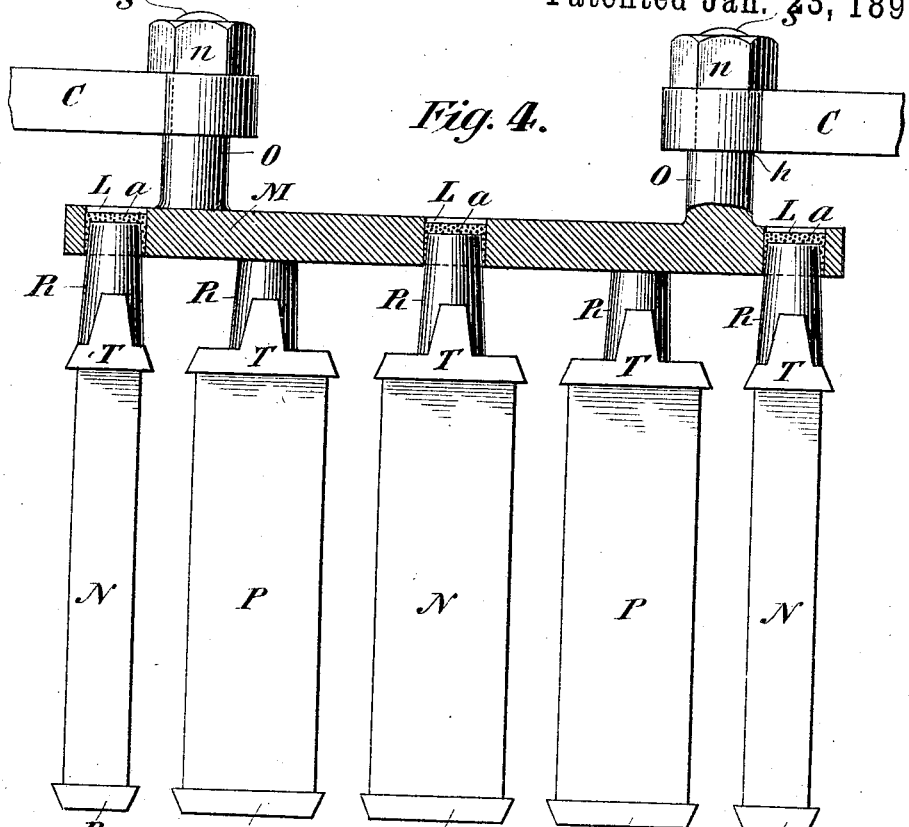
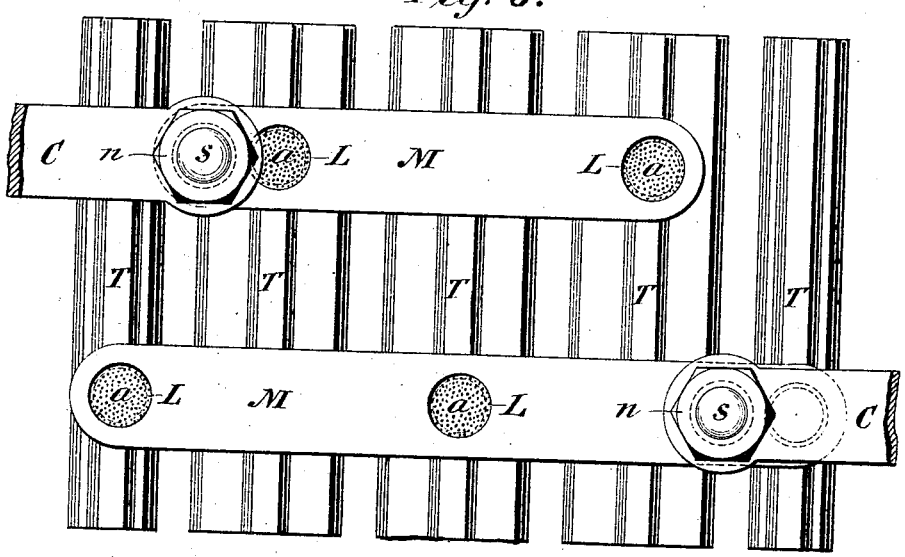

UNITED STATES PATENT OFFICE.

EVELYN PAGET AND LEONARD PAGET, OF NEW YORK, N. Y.

SECONDARY BATTERY.

SPECIFICATION forming part of Letters Patent No. 513,245, dated January 23, 1894.

Application filed February 9, 1893. Serial No. 461,631. (No model.)

*To all whom it may concern:*

Be it known that we, EVELYN PAGET, a subject of the Queen of Great Britain and Empress of India, and LEONARD PAGET, a citizen of the United States, residing in the city, county, and State of New York, have invented certain new and useful Improvements in Secondary Batteries; and we do hereby declare that the following is a full, clear, and exact description of the invention, which will enable others skilled in the art to which it appertains to make and use the same.

The object of the invention herein described is to avoid certain defects common to secondary batteries generally known in the art as "short-circuiting," "scaling," "buckling," "sulphating," &c., as well as to avoid the consequences of these defects, and to provide at the same time means of more quickly and perfectly "forming" the electrode-plates than has heretofore been effected, thereby producing as an entirety a very serviceable and useful improvement in secondary batteries. The object is effected partly by the mechanical arrangement of the battery, which is explained in the accompanying drawings, in which—

Figure 1 is a plan or top-view of an electrode; and Figs. 2 and 3 side and end views or elevations respectively. Figs. 4 and 5 illustrate how the electrodes are assembled together and connected to form one cell of a battery, as well as to illustrate the means employed to connect the cells.

The description and explanation of the construction of the battery is best made by following the course of construction adopted in actual manufacture. Thin sheet lead is first cut into strips (say of about one inch in width by ten inches in length). These strips are immersed in boiling dilute nitric acid for a short time sufficient to remove the hard skin that is formed in the process of rolling the lead into sheets, and are then set up in forms, that can be clamped, with distance-pieces between each two strips to separate the strips from each other by a distance about equal to their thickness. The ends of the strips (thus clamped) are dipped to a depth of about one-eighth of one inch in strong acetic acid, and the clamped strips are then set over a mold represented by the head or T-piece, Fig. 2, inverted, and in this position has this piece, together with the dowel-piece or pin R, cast on by a pouring of type-metal. This head-piece being then withdrawn from the mold with the attached plates, these are again hung over a mold representing the bottom or tail piece B B, and therein is poured molten type-metal as previously with the head piece, to form the tail-piece B. When this casting has been made the mold is removed as well as the clamp holding the plates, and the distance-pieces are taken out from between the plates. The electrode is then mechanically complete, *per se.* It may be supported as at $g$, Fig. 2. The electrode is then immersed for a short time, say ten to twenty minutes, in a boiling dilute solution of preferably magnesium nitrate, or of any other metallic nitrate yielding an insoluble oxide of a metal more electro-positive than lead. Thus nitrate of aluminium or manganese may be employed, but magnesia gives the best results. This process is continued until when the electrode is removed from the boiling solution it is covered with an evenly colored pale gray or whitish gray deposit having a velvety feeling to the touch. The electrodes when thus treated are assembled in a cell similar to that in which they are ultimately to be used, and are connected by placing over the dowel-pins R a connecting bar M having holes corresponding in positions to those of the pins, and into these holes L is then poured any very fusible alloy $a$. The positive electrodes P are connected to one connecting bar (shown in Fig. 5), and the negative electrodes to another (as M). These connecting bars are cast in type metal, and are provided with a post O having a shoulder $h$, and thread $s$, carrying a nut $n$, securing a piece C and making connection thus with another cell or a terminal binding post.

The electrodes N, representing the negative electrodes, have the end electrodes constructed with plates half the width of the intermediate electrodes, so as to present the same total negative surface as there is positive surface, and yet provide external negative electrodes. This arrangement tends to equality of electrolytic action.

When the electrodes are connected, a process of "forming" is proceeded with in the well known manner, the electrolyte preferred being a semi-saturated solution of the double sulphate of magnesium and ammonium, reversals of the charging current being made whenever gas is freely given off. The electrodes when formed are removed to the cell they ultimately occupy, and are there set up in the usual electrolyte. Should it be required at any time to release one of the electrodes a small blow pipe flame or heated iron directed on or near the fusible alloy will cause this alloy to melt and set free the dowel piece from its hole. By following this process, a well-formed cell can be produced from the raw material in about four hours. And by this construction "buckling" cannot occur, because the plates are evenly attached, are too wide to bend in their own plane, and if they bend into another plane come into contact with like plates electrically; there cannot be any short circuiting because if there be any scaling the scales can only fall against a like plate electrically. "Sulphating" is practically unknown as an inconvenience with plates of the Planté type, of which this is an effective modification.

Having fully described our invention, what we claim, and desire to secure by Letters Patent, is—

1. In a secondary battery, the process of construction and "formation" which consists of treating strips of lead sheet in heated dilute nitric acid to remove the "skin," setting up these strips with distance-pieces in clamps or equivalent holding device, casting thereon a head-piece carrying a dowel-piece, and a tail piece, to form an electrode, submitting this electrode to the action of a heated solution of nitrate of magnesium or its equivalent, assembling the electrodes sufficient for a cell of battery as required, connecting the electrodes to become positive and negative electrodes with main bars respectively, which bars have holes corresponding to the dowel pieces and means of connection from cell to cell, "forming" these electrodes in an electrolyte consisting of the double sulphate of magnesium and ammonium, and re-assembling the formed electrodes in cells with any convenient electrolyte.

2. In a secondary battery, a head piece of type-metal cast to the lead-strip electrodes and carrying a dowel-piece for insertion in a connecting bar.

3. In a secondary battery, treating the electrodes in a heated solution of nitrate of magnesium.

4. In a secondary battery, treating the electrodes in a heated solution of a metallic nitrate yielding an oxide of the metal that is insoluble in water, the metal being more electro-positive than lead.

5. In a secondary battery, "forming" by electrolysis the electrodes in an electrolyte of double sulphate of magnesium and ammonium.

6. In a secondary battery, electrodes consisting of a series of plain perpendicular parallel strips or plates of lead, of a length that is a small multiple of their width, with their planes set in the direction of the shortest right line joining the electrodes of opposite polarities, cast into a head or top-piece and a tail or bottom-piece of type-metal.

EVELYN PAGET.
LEONARD PAGET.

Witnesses:
JAMES TRAVERS,
GEORGE W. HARRIS.